June 22, 1926. E. E. WATERMAN 1,590,005
OPERATING ATTACHMENT FOR TRACTORS
Filed August 26, 1925 2 Sheets-Sheet 2
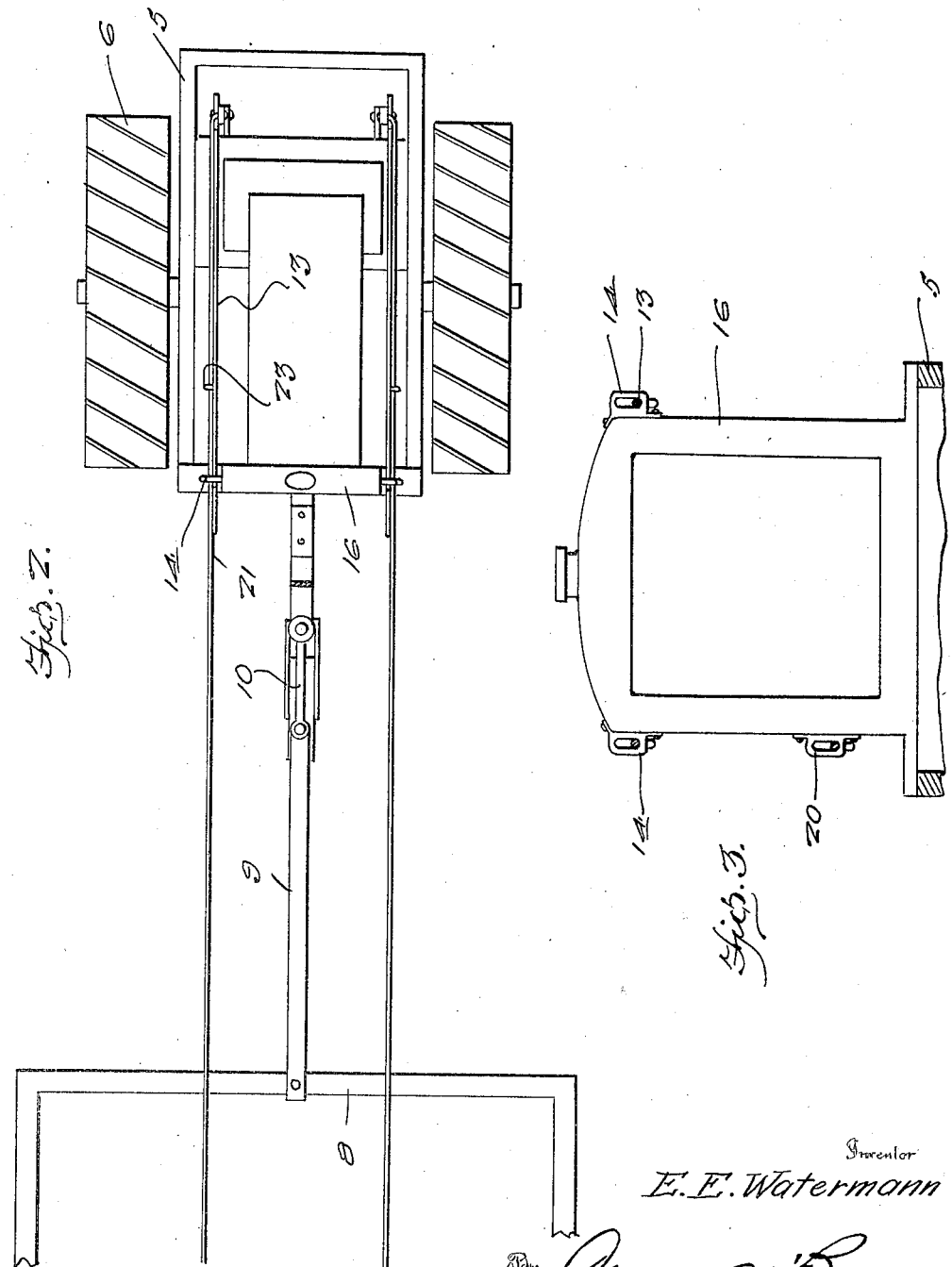

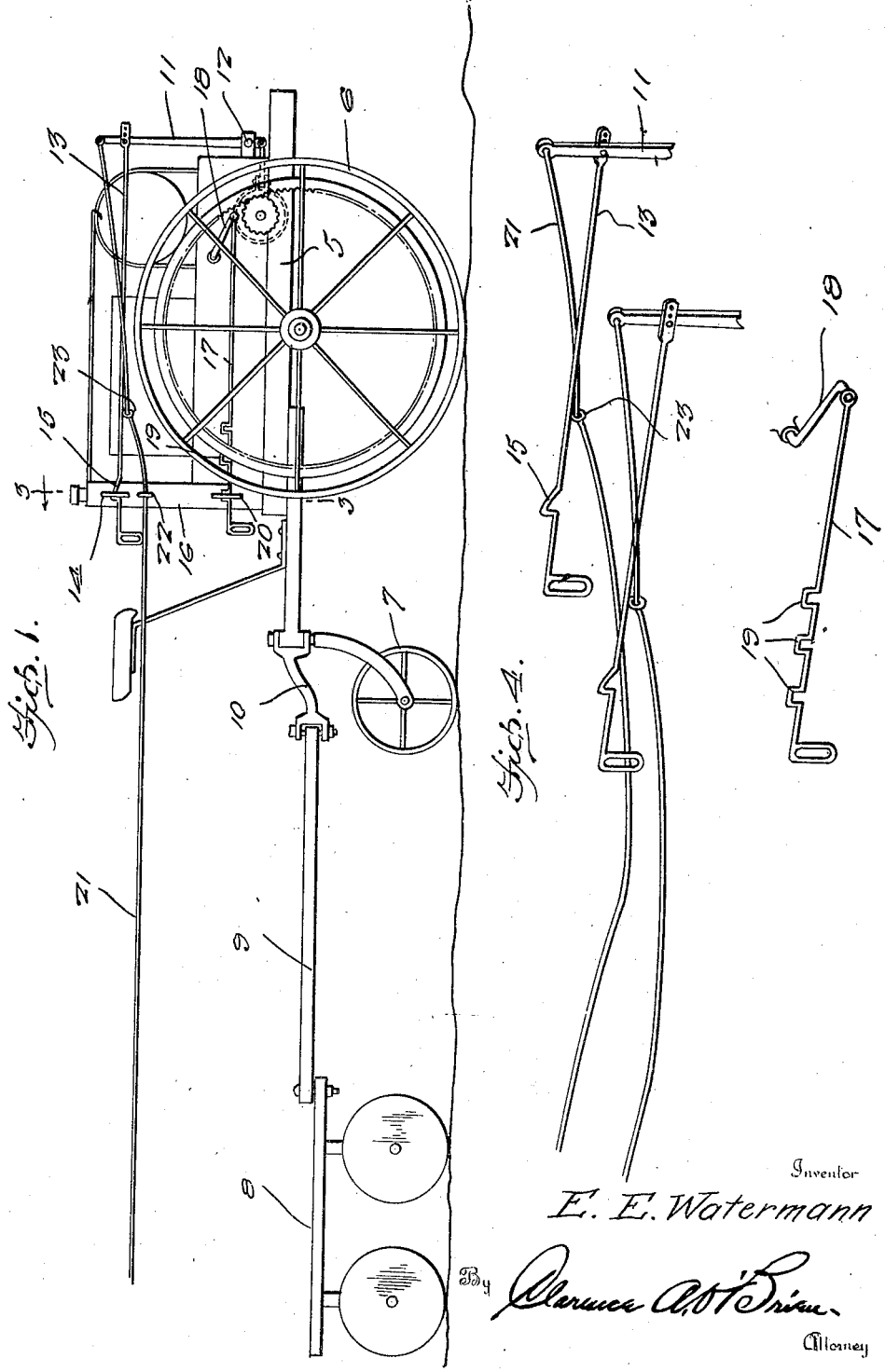

Patented June 22, 1926.

1,590,005

UNITED STATES PATENT OFFICE.

ELMER E. WATERMAN, OF REMUS, MICHIGAN.

OPERATING ATTACHMENT FOR TRACTORS.

Application filed August 26, 1925. Serial No. 52,613.

The present invention relates to improvements in tractors and more particularly to the controlling means therefor.

An important object of the invention is to provide a controlling attachment for tractors which may be operated from the implement pulled by the tractor whereby the operator may seat himself upon the implement and exercise control over the tractor such as starting, stopping, and steering the same.

Another important object of the invention is to provide a controlling attachment of this nature for tractors having a novel form of clutch releasing and brake applying means whereby the two clutches may be controlled from a distance for starting, stopping and steering the tractor.

Another object of the invention is to provide a control mechanism for tractors having novel means whereby the clutches may be released and held in a released position.

A still further object of the invention is to provide a controlling mechanism for tractors which may be readily applied without the exercise of a high degree of the skill or without necessitating any material alterations in the construction of the tractor.

Another important object of the invention is to provide a control mechanism for tractors which is of highly simplified construction, simple and easy to operate, and desirable in use.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the tractor with my improved control mechanism associated therewith.

Figure 2 is a top plan view thereof.

Figure 3 is a transverse sectional view taken substantially on line 3—3 of Figure 1 looking in the direction of the arrow, and Figure 4 is a disassembled perspective view of the control mechanism.

Referring to the drawing in detail it will be seen that 5 designates the frame of the tractor for locomotion on the wheels 6. A castor wheel 7 is associated with the rear end thereof. These wheels 6 are driven through a transmission and a double clutch mechanism, both of which are well known and understood in this art and need no detailed description herein. An implement 8 is shown hooked up to the draw bar 9 which is attached through the coupling link 10 to the tractor. A pair of clutch control levers 11 are pivoted as at 12 to the forward portion of the tractor for operating and controlling the two clutches, one of which, of course, is associated with the respective wheel 6 in the usual and well known manner. These levers also operate the brakes in a manner which is also well understood in this art. Thus when the levers are in their forwardmost position the clutches are engaged and when the levers are in their rearmost position the brakes are engaged. A rod 13 is pivoted to each lever 12 and extends through a keeper or loop 14 on the side of the radiator 16. An intermediate portion 15 of each rod 13 is bent into a ratchet like formation so that when the rod 13 is moved to swing the lever 12, attached thereto, to said lever's rearwardly most position the ratchet like intermediate portion 15 is engaged with the loop 14 and the brake is held applied. A rod 17 is attached to the gear shifting lever 18 and has three notched like bent portions 19 which are engageable with a keeper 20. The center portion 19 when engaged with the keeper holds the gears in neutral. The rearmost notch is forward speed and the forwardmost notch is reverse speed.

A pair of lines 21 are trained through guides 22 on the radiators and guides 23 on the rods 13 and have their ends attached to the upper extremities of the levers 11. These lines or reins are adapted to terminate so that they may be pulled by an operator seated on the implement 8 or walking along behind the tractor. It will be apparent that as the parts are shown in Figure 1 with the levers 11 in their brake applying position that a person standing or sitting on the trailed implement 8 may jerk the reins 21 so as to disengage the ratchet like intermediate portion 15 from the keeper 14 and allow the levers 11 to move to the clutch engaged position and thus the tractor will move along. When it is desired to make a turn, for example, to the right, the rein 21 to the right is pulled thus releasing the clutch and if desired it may be pulled so as to apply the brake on the right thereby causing the tractor to make a right hand turn. This is the use of clutches and brakes in the steering of tractors as is well known in this art and needs no detailed explanation here. Thus it will be seen that an operator may efficiently start, stop, and steer the tractor from a position to the rear thereof and independently thereof.

The present embodiment of the invention as is disclosed in detail merely by way of example since in actual practice it attains the features of advantage enumerated as desirable in the statement of the invention and the above description. It is apparent that changes and details of construction, and that the combination and arrangement of parts may be resorted to without departing from the spirit or scope of the invention as hereinafter described and claimed.

Having described my invention what I claim as new is:—

1. A tractor control mechanism including in combination a pair of levers for operating the clutch and brake mechanism of a tractor, rods pivotally engaged with the levers, keepers through which the rods extend, intermediate portions of the rods being bent ratchet like for engagement with the keepers, and reins attached to the levers.

2. A tractor control mechanism including in combination a pair of levers for operating the clutch and brake mechanism of a tractor, rods pivotally engaged with the levers, keepers through which the rods extend, intermediate portions of the rods being bent ratchet like for engagement with the keepers, reins attached to the levers, guide means for receiving the reins on the rods and guide means for receiving the reins on the tractor.

In testimony whereof I affix my signature.

ELMER E. WATERMAN.